S. S. ELDER.
Churn.
No. 84,619.
Patented Dec. 1, 1868.
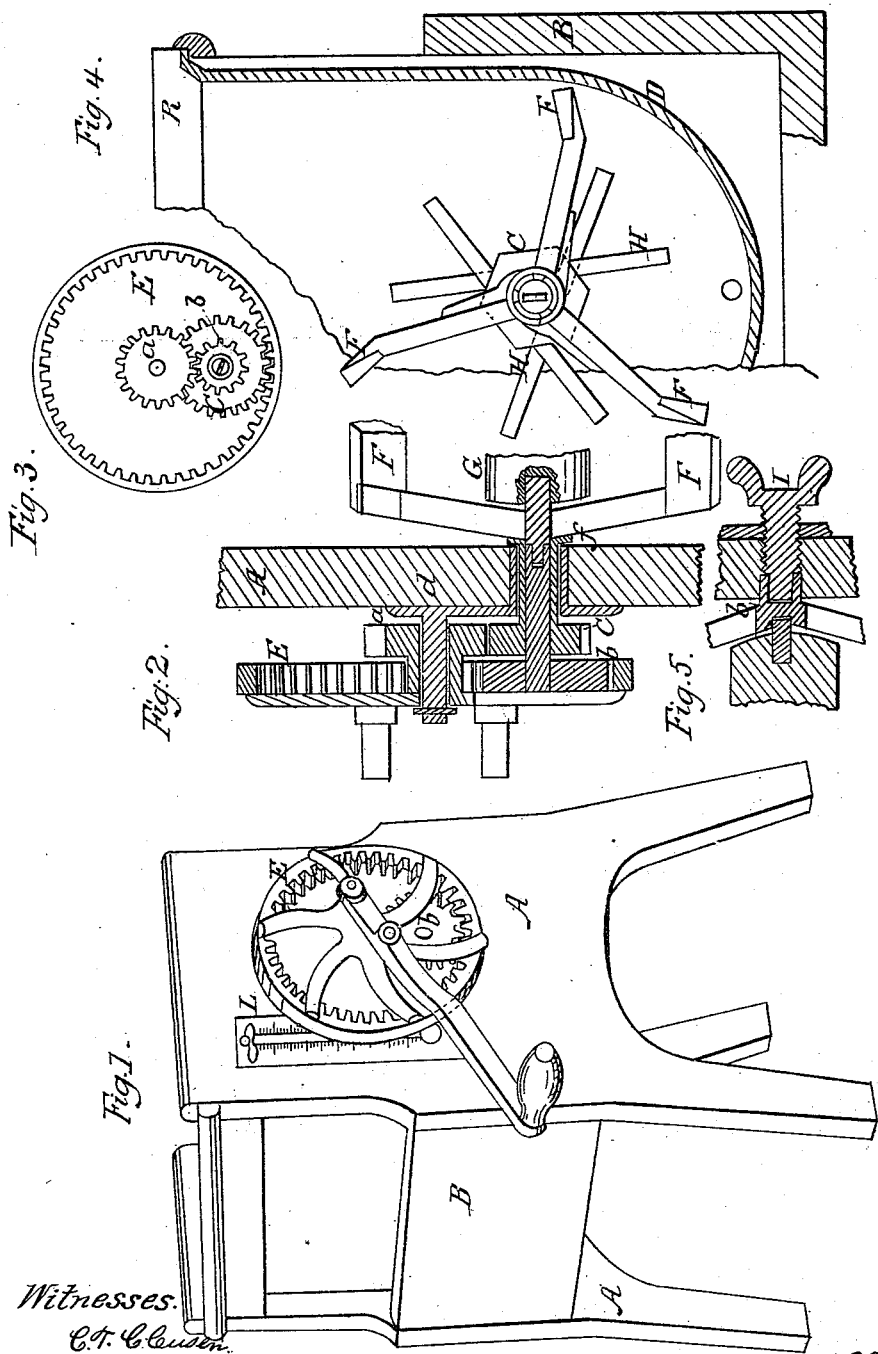

United States Patent Office.

SAMUEL S. ELDER, OF SPRINGFIELD, ILLINOIS.

Letters Patent No. 84,619, dated December 1, 1868.

IMPROVEMENT IN CHURNS.

The Schedule referred to in these Letters Patent and making part of the same.

*To all whom it may concern:*

Be it known that I, SAMUEL S. ELDER, of Springfield, in the county of Sangamon, and State of Illinois, have invented a new and useful Improvement in Churns; and I do hereby declare that the following is a full, clear, and exact description of the same, reference being had to the annexed drawings, making part of this specification, in which—

Figure 1 is a perspective view of the churn.

Figure 2 is a vertical longitudinal section, showing the arrangement of the gearing for rotating the agitators, the manner of securing the same to the head, and also of connecting them with the agitators.

Figure 3 is an inner or rear-side view of the gearing.

Figure 4 is an end view of the agitators, showing a part of the body of the churn in section.

Figure 5 is a longitudinal section, showing the means of detaching the agitators for the purpose of permitting them to be removed from the churn.

Corresponding letters refer to corresponding parts in the several figures.

A A are the ends of the frame-work of the churn, to one of which the gearing is attached, as shown in figs. 1 and 2 of the drawings.

B B are the longitudinal portions of the frame-work, which, together with the bottom board and ends, form a receptacle for water which may be used therein to regulate the temperature of the cream or milk to be churned.

C is a vessel of metal, or of any suitable material, semicircular at its bottom, and having open ends and top, but which is so placed with reference to the ends A that they close up its ends, leaving only its top open for the reception of the material to be churned. This vessel is placed between the ends of the frame, but in contact therewith, so as to form a tight joint, while its sides run parallel to but some distance from the sides and bottom of such frame, so as to leave a space, D, for water, as above described.

E is an internal gear-wheel, which carries upon its hub another and external gear-wheel, the two being arranged to revolve upon a stud which projects from the plate $d$, which is secured to the head A.

The last mentioned, or smaller gear-wheel, meshes into a pinion $a$, which is placed upon the end of a tubular or hollow journal, whose inner end is secured to the head of the outer revolving agitator, while the larger, or internal gear, meshes into and revolves the pinion $b$, which is attached to the journal of the inner revolving agitator, which passes through the journal of the outer one.

It will be seen that the above-described arrangement of gears will give to the agitators a reverse motion, the crank, which is attached to the wheel E, affording means for applying the power thereto.

F F are the outer agitators, which are of peculiar construction, they being so placed upon the arms that, as they strike upon the cream or milk, their greatest surface comes in contact therewith, by which means a direct blow is given, which has a tendency to break the globules or butter-cells much more rapidly than would be possible were they allowed to enter the cream upon an angle to its surface.

G is a shaft, which passes centrally and longitudinally through or between the outer agitators, and is provided with a series of arms, H, which pass through it, and are of such length as to permit them to rotate within the outer agitators, as shown in fig. 4.

This shaft, G, has inserted in that end thereof which is nearest to the driving-mechanism, a journal, of any suitable metal, the outer end of which is provided with transverse slots, which receive corresponding projections upon the end of the driving-shaft or stud, which carries the pinion $a$, thus forming a clutch-coupling for connecting the two shafts, and providing for the rotation of shaft G and its agitators.

The opposite end of this shaft is also provided with a journal, which enters the metal socket $e$, to which the arms of the outer agitators are attached, in which it finds its bearing, and in which it rotates.

I is a set-screw, which passes through the end, A, of the vessel which contains the cream, and is held in position therein by means of a flanged nut secured thereto. The inner end of this set-screw is made to enter a socket formed in the end of $e$, and is for the purpose of sliding the agitators longitudinally towards and into gear with the driving-shaft, when said agitators are being replaced after having been removed for any purpose.

This arrangement of devices for removing and replacing the agitators affords facilities for the ready removal of the agitators, without in any manner disturbing their relation to each other, and also without removing or deranging the gearing or any of the other parts of the churn.

K is the cover to the vessel which contains the cream, which is provided with glass windows through which the condition of the contents may at any time be observed.

L is a thermometer, placed upon the end, A, of the cream-vessel, for the purpose of indicating the temperature of such cream. This thermometer is arranged directly behind the gear-wheels, by which it is protected from being broken.

Having thus described my invention,

What I claim, and desire to secure by Letters Patent, is—

1. The within-described construction and arrangement of agitators F.

2. The combination of the driving-mechanism, arranged as described, with the agitators F and C.

In testimony whereof, I have signed my name to this specification, in the presence of two subscribing witnesses.

SAMUEL S. ELDER.

Witnesses:
 WM. STONEBURGER,
 JAMES H. BARKLEY.